(12) United States Patent
Napoli et al.

(10) Patent No.: US 10,439,730 B2
(45) Date of Patent: Oct. 8, 2019

(54) METHOD, DEVICE AND COMMUNICATION SYSTEM FOR REDUCING OPTICAL TRANSMISSION IMPAIRMENTS

(71) Applicant: Xieon Networks S.a.r.l., Senningerberg (LU)

(72) Inventors: Antonio Napoli, Munich (DE); Chien-Yu Lin, Erlangen (DE); Bernhard Spinnler, Oberhaching (DE); Vincentius Antonius Johannes Mar Sleiffer, Gendt (NL)

(73) Assignee: Xieon Networks S.à.r.l., Luxembourg (LU)

( * ) Notice: Subject to any disclaimer, the term of this patent is extended or adjusted under 35 U.S.C. 154(b) by 0 days.

(21) Appl. No.: 14/890,373

(22) PCT Filed: May 12, 2014

(86) PCT No.: PCT/EP2014/059654
§ 371 (c)(1),
(2) Date: Nov. 10, 2015

(87) PCT Pub. No.: WO2014/184139
PCT Pub. Date: Nov. 20, 2014

(65) Prior Publication Data
US 2016/0127047 A1 May 5, 2016

(30) Foreign Application Priority Data
May 13, 2013 (EP) .................................. 13167440

(51) Int. Cl.
*H04B 10/60* (2013.01)
*H04B 10/58* (2013.01)
(Continued)

(52) U.S. Cl.
CPC ......... *H04B 10/58* (2013.01); *H04B 10/2543* (2013.01); *H04B 10/60* (2013.01); *H04B 10/6163* (2013.01)

(58) Field of Classification Search
CPC .... H04B 10/58; H04B 10/2543; H04B 10/60; H04B 10/6163
(Continued)

(56) References Cited

U.S. PATENT DOCUMENTS 8,095,019 B2* 1/2012 Kaneda ................. H04B 10/61
398/183
8,447,190 B2* 5/2013 Tanimura ........... H04B 10/6971
398/147

(Continued)

FOREIGN PATENT DOCUMENTS

WO 2014184139 A1 11/2014

OTHER PUBLICATIONS

Pan et al, Volterra Filtering for Nonlinearity Impairment Mitigation in DP 16QAM and DP QPSK Fiber Optic Communication Systems, Jun. 2011, IEEE, OSA, All Document.*
(Continued)

*Primary Examiner* — Dibson J Sanchez
(74) *Attorney, Agent, or Firm* — Nelson Mullins Riley & Scarborough LLP

(57) ABSTRACT

A method and device is provided for reducing optical transmission impairments, particularly nonlinear effects, of at least one link Said method comprising the following steps: extracting a phase information ($\Delta\theta$) from an optical signal (120) received via that at least one link, determining a nonlinear coefficient ($\gamma$), associated with the at least one link, based on the phase information ($\Delta\theta$), applying a control mechanism (202) using the nonlinear coefficient ($\gamma$). Furthermore, a communication system is suggested comprising said device.

11 Claims, 14 Drawing Sheets

(51) Int. Cl.
  *H04B 10/2543*  (2013.01)
  *H04B 10/61*    (2013.01)
(58) Field of Classification Search
  USPC .................................................. 398/202–214
  See application file for complete search history.

(56) References Cited

U.S. PATENT DOCUMENTS

| | | | | |
|---|---|---|---|---|
| 8,478,137 B2* | 7/2013 | Komaki | ................ | H04B 10/61 |
| | | | | 398/203 |
| 8,553,821 B1* | 10/2013 | Eliaz | ................ | H04L 25/03178 |
| | | | | 375/348 |
| 9,225,429 B2* | 12/2015 | Yu | ................ | H04B 10/616 |
| 9,258,060 B2* | 2/2016 | Yan | ................ | H04B 10/2507 |
| 2005/0019042 A1* | 1/2005 | Kaneda | ................ | H04B 10/695 |
| | | | | 398/208 |
| 2009/0190926 A1* | 7/2009 | Charlet | ................ | H04B 10/532 |
| | | | | 398/74 |
| 2009/0245809 A1* | 10/2009 | Nakamoto | ................ | H04B 10/2507 |
| | | | | 398/159 |
| 2010/0014873 A1* | 1/2010 | Bulow | ................ | H04B 10/6161 |
| | | | | 398/208 |
| 2010/0232796 A1* | 9/2010 | Cai | ................ | H04B 10/677 |
| | | | | 398/79 |
| 2011/0255879 A1* | 10/2011 | Xie | ................ | H04B 10/2513 |
| | | | | 398/208 |
| 2011/0318014 A1* | 12/2011 | Von Lerber | ................ | H04B 10/677 |
| | | | | 398/115 |
| 2012/0027418 A1* | 2/2012 | Secondini | ................ | H04B 10/6971 |
| | | | | 398/158 |
| 2012/0051742 A1* | 3/2012 | Li | ................ | H04B 10/0795 |
| | | | | 398/38 |
| 2012/0076235 A1* | 3/2012 | Dou | ................ | H04B 10/2543 |
| | | | | 375/296 |
| 2012/0082468 A1* | 4/2012 | Qian | ................ | H04B 10/2543 |
| | | | | 398/188 |
| 2012/0290244 A1* | 11/2012 | Yan | ................ | H04B 10/255 |
| | | | | 702/86 |
| 2013/0084080 A1* | 4/2013 | Shibutani | ................ | H04B 10/6161 |
| | | | | 398/208 |
| 2013/0108260 A1* | 5/2013 | Yan | ................ | H04B 10/2543 |
| | | | | 398/25 |
| 2013/0195459 A1* | 8/2013 | Shieh | ................ | H04L 27/2614 |
| | | | | 398/79 |
| 2013/0209089 A1* | 8/2013 | Harley | ................ | H04B 10/5561 |
| | | | | 398/25 |
| 2013/0230313 A1* | 9/2013 | Yan | ................ | H04L 25/0202 |
| | | | | 398/25 |
| 2013/0243433 A1* | 9/2013 | Yan | ................ | H04B 10/2507 |
| | | | | 398/65 |
| 2013/0251370 A1* | 9/2013 | Ogasahara | ................ | H04B 10/6166 |
| | | | | 398/65 |
| 2013/0302041 A1* | 11/2013 | Matsui | ................ | H04B 10/6971 |
| | | | | 398/208 |
| 2013/0308960 A1* | 11/2013 | Horikoshi | ................ | H03H 21/0012 |
| | | | | 398/209 |
| 2014/0093255 A1* | 4/2014 | Liu | ................ | H04B 10/6161 |
| | | | | 398/208 |
| 2014/0099128 A1* | 4/2014 | Mateo | ................ | H04B 10/6163 |
| | | | | 398/158 |
| 2014/0247906 A1* | 9/2014 | Pang | ................ | H03F 1/3247 |
| | | | | 375/297 |
| 2014/0286642 A1* | 9/2014 | Lowery | ................ | H04B 10/697 |
| | | | | 398/115 |
| 2015/0071630 A1* | 3/2015 | Oyama | ................ | H04B 10/6163 |
| | | | | 398/25 |
| 2015/0104189 A1* | 4/2015 | Fan | ................ | H04B 10/2557 |
| | | | | 398/147 |
| 2015/0236795 A1* | 8/2015 | Malouin | ................ | H04B 10/6166 |
| | | | | 398/65 |
| 2015/0288458 A1* | 10/2015 | Honda | ................ | H04J 14/02 |
| | | | | 398/81 |
| 2015/0295649 A1* | 10/2015 | Peng | ................ | H04B 10/541 |
| | | | | 398/147 |
| 2015/0372765 A1* | 12/2015 | Yasuda | ................ | H04B 10/613 |
| | | | | 398/29 |
| 2016/0036528 A1* | 2/2016 | Zhao | ................ | H04B 10/58 |
| | | | | 398/141 |
| 2016/0036554 A1* | 2/2016 | Yasuda | ................ | H04B 10/6161 |
| | | | | 398/65 |
| 2016/0065312 A1* | 3/2016 | Oyama | ................ | H04B 10/2543 |
| | | | | 398/194 |
| 2016/0094292 A1* | 3/2016 | Mochizuki | ................ | H04B 10/6165 |
| | | | | 398/208 |
| 2016/0226582 A1* | 8/2016 | Oyama | ................ | H04B 10/0775 |
| 2016/0294480 A1* | 10/2016 | Mertz | ................ | H04B 10/6163 |
| 2017/0264468 A1* | 9/2017 | Millar | ................ | H04B 10/61 |
| 2018/0034552 A1* | 2/2018 | Oyama | ................ | H04J 14/06 |
| 2018/0234184 A1* | 8/2018 | Tanimura | ................ | H04B 10/2513 |

OTHER PUBLICATIONS

Bermudez, Adaptive Filtering Theory and Applications, May 2011, IRIT, All Document.*
Regev, EVM Test Impairments, May 2012, Presto Engineering, Pages All Document. https://www.slideshare.net/chiportal/evm-test-impairements.*
Peng et al, Per symbol based digital back propagation approach for PDM CO OFDM transmission systems, Jan. 2013, Optics Express vol. 21, No. 2, Pages All Document. (Year: 2013).*
Asif, R. et al., "Optimized Digital Backward Propagation for Phase Modulated Signals in Mixed-Optical Fiber Transmission Links," Optics Express, vol. 18(22) pp. 22796-22807, Oct. 25, 2010, XP002715061.
Guiomar, F. P. et al., "Optimizing the Nonlinear Operator in Backward Propagation," Eurocon International Conference on Computer as a Tool (EUROCON), 2011 IEEE, Apr. 27-29, 2011, Lisbon Portugal, IEEE, Piscataway, NJ, Apr. 27, 2011, pp. 1-4, XP031949634,DOI: 10.1109/EUROCON.2011.5929356 ISBN: 978-1-4244-7486-8.
International Search Report and Written Opinion, PCT/EP2014/059654, dated Aug. 18, 2014, 10 pages.
Tanimura, T. et al., "Semi-blind Nonlinear Equalization in Coherent Multi-Span Transmission System with Inhomogeneous Span Parameters," Optical Fiber Communication (OFC), Collocated National Fiber Optic Engineers Conference, 2010 Conference on (OFC/NFOEC), IEEE, Piscataway, NJ, USA, Mar. 21, 2010, pp. 1-3, XP031676785.

* cited by examiner

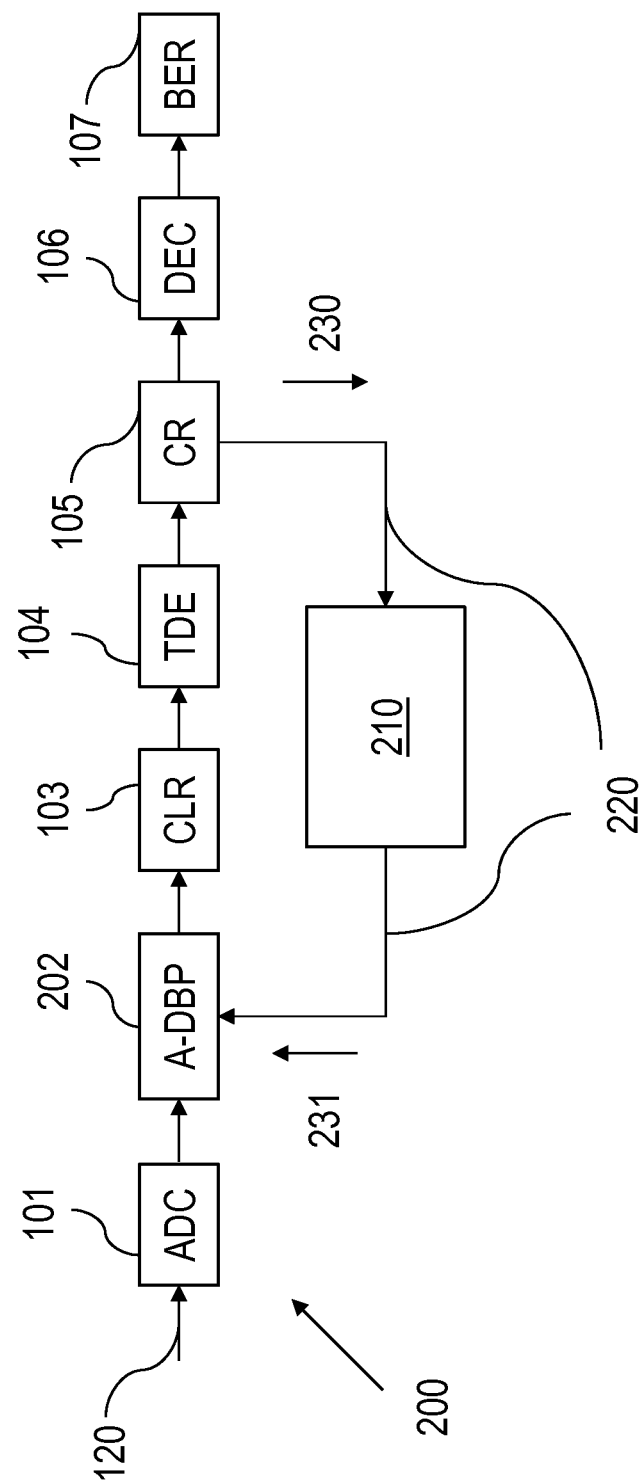

METHOD, DEVICE AND COMMUNICATION SYSTEM FOR REDUCING OPTICAL TRANSMISSION IMPAIRMENTS

CROSS REFERENCE TO RELATED APPLICATIONS

This application is a 35 U.S.C. 371 national stage filing of International Application No. PCT/EP2014/059654, filed on May 12, 2014. The contents of the aforementioned applications are hereby incorporated by reference in their entireties.

The invention relates to a method, to a device and to a communication system for reducing optical transmission impairments.

Transmission impairments in optical fiber can be divided into two categories: linear and nonlinear impairments. Linear impairments include chromatic dispersion (CD), polarization-mode dispersion (PMD), symbol timing offset and optical filtering. Nonlinear propagation impairments (some of them are induced by the "Kerr effect") include self-phase modulation (SPM), cross-phase modulation (XPM), four-wave mixing (FWM) and nonlinear phase noise (NLPN). Especially with advanced modulation formats, the influence of fiber transmission impairments is of high interest and nonlinear effects represent the most severe limitation in increasing the product bandwidth and distance in high speed long haul optical communication.

Various methods of compensating fiber transmission impairments have been investigated in recent areas, both in optical and electronic domain. The implementations of all-optical methods are practically expensive, less flexible and complex to implement. On the other hand, with the development of coherent receivers based on Digital Signal Processing (DSP), electronic compensation techniques have emerged as the promising techniques for long-haul optical data transmission. After coherent demodulation the signals can be sampled and processed by DSP to compensate for fiber transmission impairments. This digital compensation is considered of importance for mitigation of fiber transmission impairments as it can offer great flexibility and adaptation.

By solving the nonlinear Schrödinger equation, the optical signal amplitude and phase can be estimated at each point of the fiber. Based on the inverse mathematical solution of the nonlinear Schrödinger equation a compensating algorithm has been proposed as a universal technique for jointly compensating linear and nonlinear impairments which is referred to as Digital Back Propagation (DBP). The nonlinear coefficient $\gamma$ ("Gamma") and the effective length of the fiber are exemplary parameters of DBP to be adjusted and optimized.

In [Asif et al., "Optimized digital backward propagation for phase modulated signals in mixed-optical fiber transmission links", 25 Oct. 2010/Vol. 18, No. 22/OPTICS EXPRESS 22796] a parametric optimization of a Digital Backward Propagation algorithm for mitigating fiber transmission impairments is proposed and numerically demonstrated for phase modulated signals in mixed-optical fiber transmission links.

In next generation optical transmission systems (characterized in particular by the functional combination of fiber optics technology together with Internet protocols), phase modulated optical signals will be used at a high symbol rate. This means nonlinear transmission impairments like Self-Phase Modulation (SPM) are limiting effects and therefore DBP may lead to a significant improvement of transmission performance.

The DBP method assumes full knowledge of the link (i.e. knowledge of the fiber span configurations and parameters) in terms of fiber types, measured optical powers, fiber lengths, etc. Unfortunately, such information is usually only partially available. Therefore, based on an accurate inversion of the optical propagation equation, DBP cannot provide reliable distortion compensation if a precise description of the link is missing.

Optical systems may consist of tens or even hundreds of links. Hence, it is quite unlikely that an accurate system description can be obtained. Moreover, even assuming a perfect knowledge of the link, the values of the optical power along the system cannot be measured correctly. This causes a further degree of uncertainty whenever a DSP is designed to compensate nonlinearities by applying DBP.

[T. Tanimura et al., "Semi-blind Nonlinear Equalization in Coherent Multi-Span Transmission System with Inhomogeneous Span Parameters", OSA/OFC/NFOEC 2010] discloses a digital coherent receiver employing semi-blind dual-polarization nonlinear compensator (DP-NLC), whereas a semi-blind algorithm is proposed that optimizes the parameter values of a nonlinear compensator based on limited prior information of the link. Concerning this, effective Q-factors (which are related to the signal quality) are derived by analyzing the bit errors rate (BER) after polarization de-multiplexing, frequency offset compensation, a Viterbi & Viterbi carrier recovery, symbol decision and differential decoding. Quality parameters are adjusted based on the signal, wherein such quality parameters are fed to the nonlinear compensator. An optimization of the parameter values, however, is only possible after BER determination, which causes time delays.

The problem to be solved is to provide an improved optical performance monitoring technique, particularly an improved and robust solution for DBP implementation.

This problem is solved according to the features of the independent claims. Further embodiments result from the depending claims.

In order to overcome this problem, a method is provided for reducing optical transmission impairments, particularly nonlinear effects, of at least one link, comprising the following steps:
a) extracting a phase information from an optical signal received via the at least one link,
b) determining a nonlinear coefficient, associated with the at least one link, based on the phase information,
c) applying a control mechanism based on the nonlinear coefficient.

This solution represents an optical performance monitoring technique to estimate the nonlinear coefficient $\gamma$ (Gamma) of a homogeneous link.

A "fiber optic link" may be a transmitter, receiver, cable assembly or an interface that can transmit information between two points.

A link may also be a fiber optic span in the sense of an optical fiber/cable terminated at both ends optionally including devices that add, subtract or attenuate optical signals.

Without any need for using a FEC (Forward Error Correction) module (i.e. BER analysis) in order to adjust the nonlinear coefficient $\gamma$ this solution beneficially uses information which is already available after carrier recovery of the received signal which results in an accelerated determination of a correct or an improved nonlinear coefficient $\gamma$.

In an embodiment, the steps a) to c) will be repeated until the nonlinear coefficient value reaches or exceeds a value or threshold. The value can be a predetermined value.

In a further embodiment, the steps a) to c) will be repeated until the nonlinear coefficient value reaches an optimal value. Beneficially, after steps a) to c) have stopped, the bit error rate (BER) of an information transmission over the link or span may have reached its minimum.

In another embodiment, the control mechanism comprises a Digital Backward Propagation algorithm (DBP). DBP is a universal technique for jointly compensating linear and nonlinear impairments.

In a further embodiment, the phase information is extracted after a carrier recovery of the received optical signal. By processing the signal after carrier recovery the determination of an improved nonlinear coefficient γ can be accelerated.

In a next embodiment, a cost function is derived based on the extracted phase information and an optimization algorithm is applied in connection with that cost function to determine the nonlinear coefficient γ. By applying the optimization algorithm for the cost function, it allows speeding up a convergence to correct or tune the nonlinear coefficient γ towards its optimal value. The optimization may indicate, that only an absolute or local minimum is remaining.

It is also an embodiment that the extracted phase information comprises a spreading of receiving symbols being part of that received coherent optical signal, and that the determination of the nonlinear coefficient γ is such that a reduced spreading of the receiving symbols is achieved. Spreading can be understood as a statistical function, also known as "scattering" or "inter-symbol interference".

Pursuant to another embodiment, the respective spreading of the received symbols comprises respective phase differences between the received symbols and respective transmitted symbols which are derived either with or without a training sequence. A "blind method" (using symbols which have already been decided or classified) or a data aided method (using training symbols) are both valid.

According to an embodiment, the received optical signal is a coherent signal based on a 16 QAM modulation, wherein
the 4th power is applied to the received optical signal,
the respective phase differences are derived from a 4th power signal,
the cost function, based on those derived phase differences, is defined as

CF=[δθ1+δθ3]*(1/R2)+δθ2*(1/R1+1/R3)

wherein
δθ1, δθ2, and δθ3 represent a standard deviation for each of the respective phase differences θ1 to θ3, and
R1, R2 and R3 represent the radii of the 16 QAM constellation.

According to another embodiment, the optimization algorithm is based on the steepest descent algorithm.

In a next embodiment the steepest descend algorithm is defined as

γ(i+1)=γ(i)+μΔγ(i)

wherein
i is an index of a discrete time;
γ(i+1) represents the value of the nonlinear coefficient at an iteration (i+1);
γ(i) represents the value of the nonlinear coefficient at a preceding iteration step (i);
μ represents the convergence factor, comprising an effective fiber length $L_{eff}$ and a channel power P;
Δγ(i)=∂CF(γ)/∂γ is a gradient of the cost function over a nonlinear coefficient.

The effective fiber length may be derived according to the following exemplary relation:

$$L_{eff} = \frac{1 - \exp(-\alpha L)}{\alpha},$$

wherein
α is a fiber attenuation defined in [Np/km].

According to a next embodiment, the optimization algorithm starts by calculating two values of the cost function corresponding to two different values of the nonlinear coefficient γ, and wherein the first starting value of the nonlinear coefficient is represented by a selected initial value.

As the proposed method represents a robust optimization algorithm any kind of value can be selected as initial starting value, preferred based on experience and possible real physical values.

Pursuant to yet an embodiment, the nonlinear coefficient γ is refined as an n-dimensional nonlinear coefficient, representing n single links, wherein the n-dimensional nonlinear coefficient is determined by an n-dimensional calculation. According to this embodiment, optical transmission impairments of more than one optical link can be compensated. Beneficially, the proposed solution can be applied in future network scenarios where optical signals are transmitted via several links.

The problem stated above is also solved by a device comprising a control mechanism for reducing optical transmission impairments, particularly nonlinear effects, of at least one link which can be connected to the device and a processor unit. The processor unit is arranged such that the following steps can be executed or processed:
a) extracting a phase information from an optical signal received via that at least one link,
b) determining a nonlinear coefficient, associated with the at least one link, based on the phase information,
c) applying the control mechanism using the nonlinear coefficient.

According to an embodiment, the device is a communication device, in particular a or being associated with a receiver for optical signals.

The problem stated supra is further solved by a communication system comprising the device as described herein.

Embodiments of the invention are shown and illustrated in the following figures:

FIG. 2a shows a block diagram of a DSP-based coherent receiver according to the proposed solution;

Figure 6:
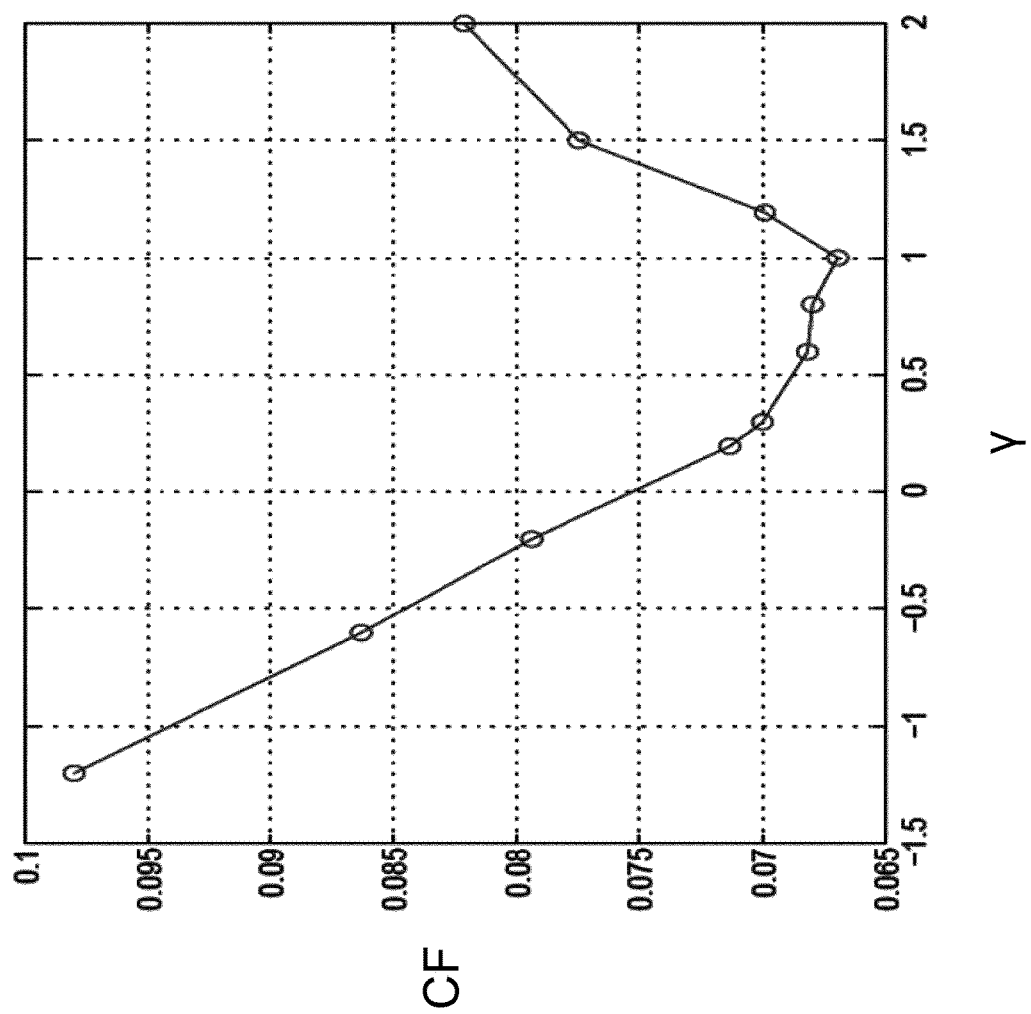
Figure 7:
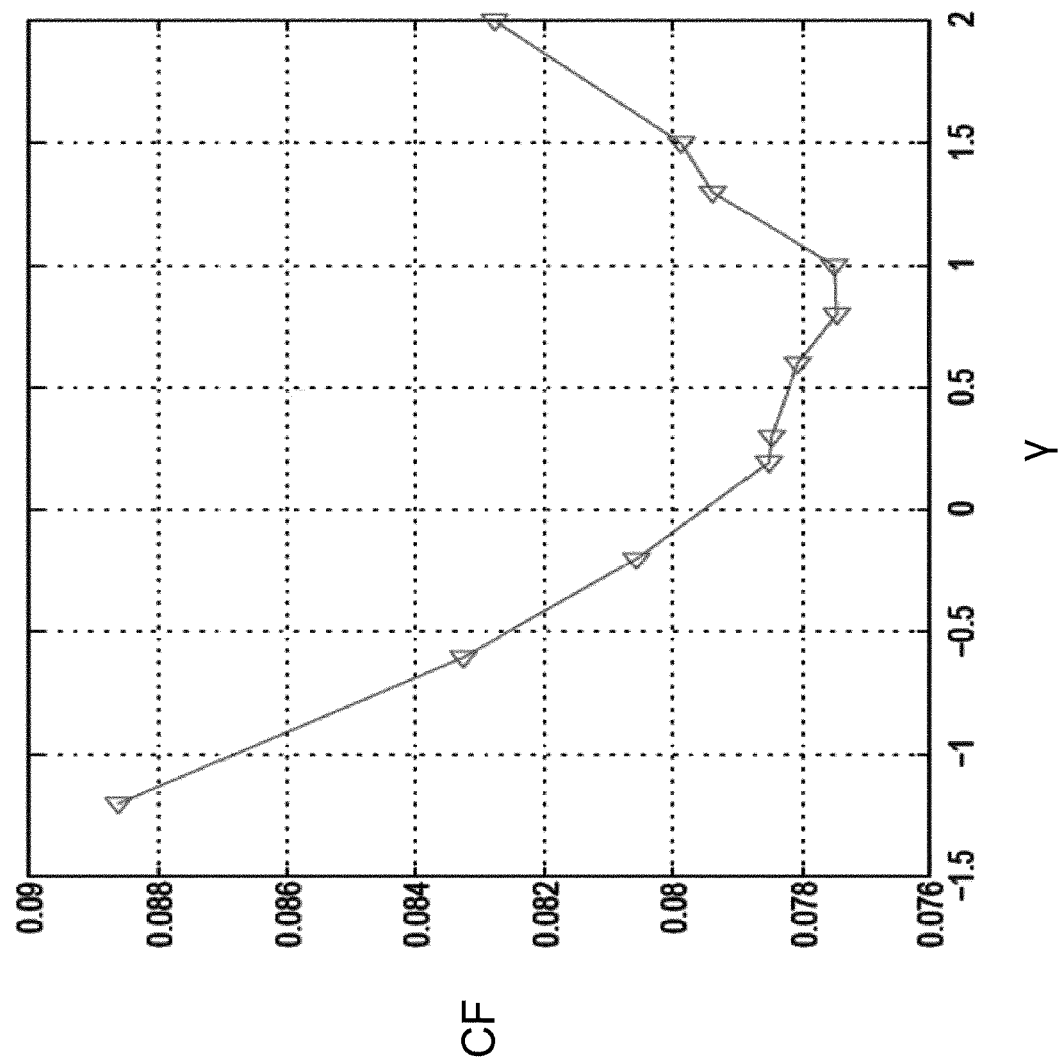
Figure 8:
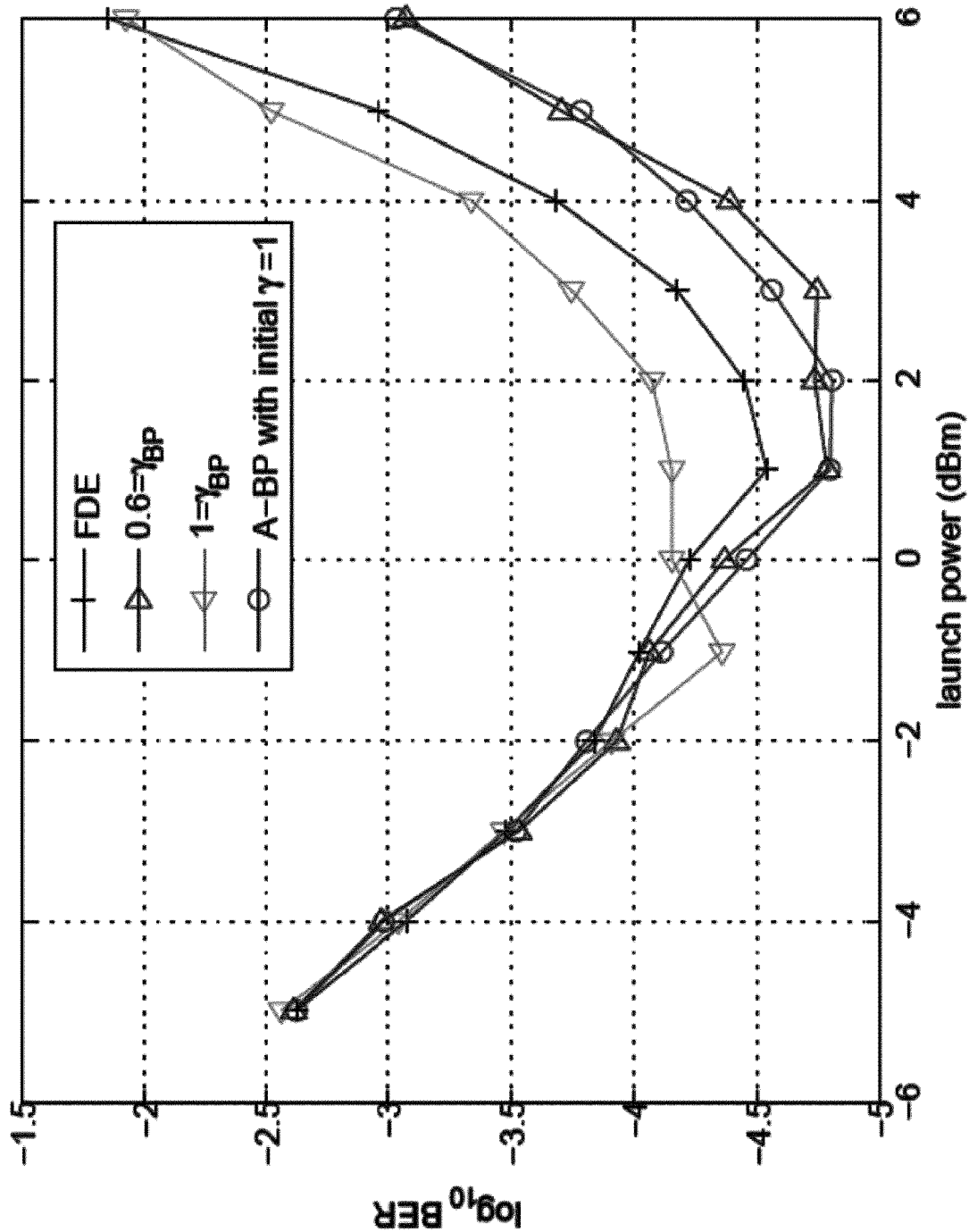
Figure 9:
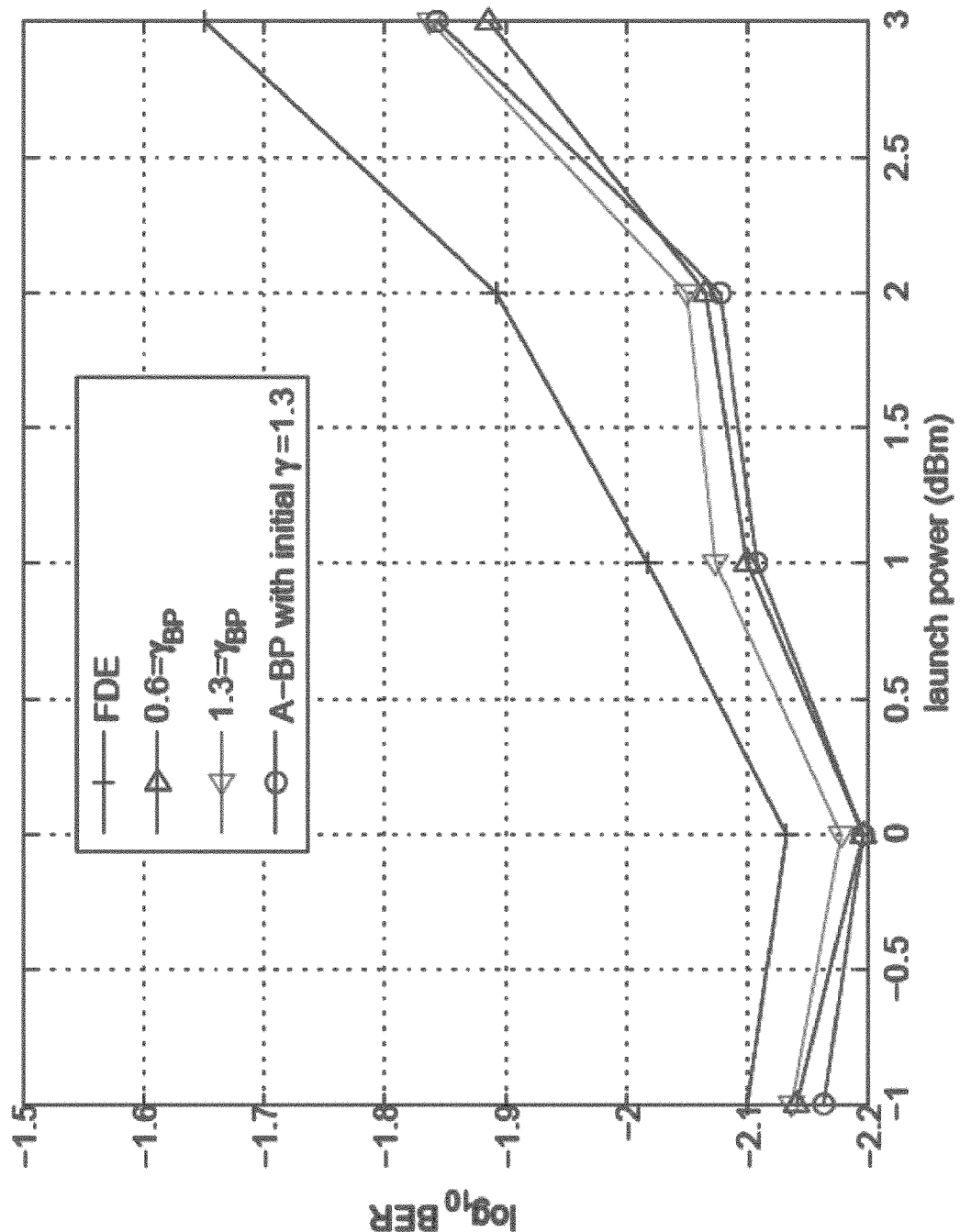

FIG. 6 exemplarily shows a derived cost function CF for determining an optimized value of the nonlinear coefficient γ based on a 16 QAM modulated signal over a standard single-mode fiber;

FIG. 7 shows an example of a derived cost function based on a 16 QAM modulated signal over a large-effective area pure silica core fiber;

FIGS. 8 and 9 each shows an example concerning the quality performance of the proposed method;

FIG. 10 to 13 each shows a further example of a signal constellation diagram applied to the $4^{th}$ power, based on a further exemplary modulation format.

Figure 1:
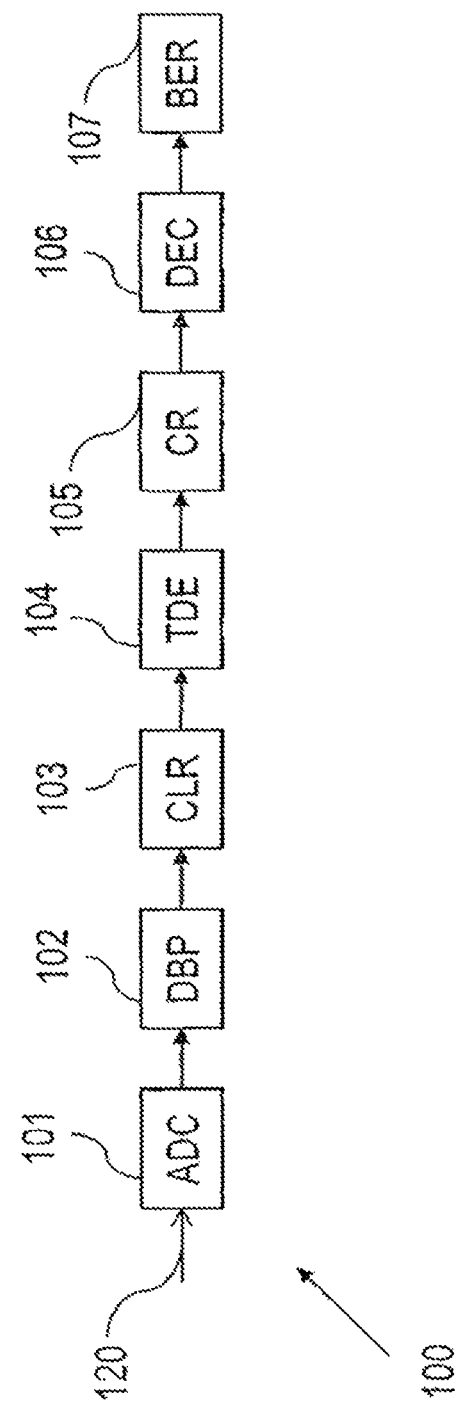
FIG. 1 shows a block diagram of an optical coherent receiver based on digital signal processing (DSP)

With reference to FIG. 1, a common used DSP-based coherent receiver is exemplarily depicted according to prior art. In a first step a received signal 120 is digitally converted by a block of four analog-to-digital converters 101. In a following step bulk chromatic dispersion and nonlinear effects are compensated by a Digital Back-Propagation (DBP) algorithm implemented by a DBP Module 102. After a time synchronization provided by a clock recovery module 103, a signal polarization de-multiplexing is performed by a time domain equalizer 104, which can also be implemented in a carrier recovery module 105. The succeeding steps process received coherent signals via the modules carrier recovery 105, decision making on received symbols 106 and estimation of a bit error rate 107.

The coherent receiver can be refined as a data-aided receiver (i.e. using training sequences (TS)). Nevertheless, the proposed method can also be realized by utilizing a receiver, which operates without training sequences (also referred to as "blind receiver").

The DBP algorithm or DBP module 102 requires a description of the link, which is used for back-propagation purposes. It is one of the advantages of the proposed solution that DBP can be used even by applying an arbitrary or incorrect link description. An incorrect link description can result (among others) the following, statistically independent, sources of errors:

the fiber length (which is possibly incorrect),
the fiber type (which is possibly wrong) or
the power levels (which can not be measured accurately)

Generally, it can be distinguished between homogeneous and inhomogeneous links. Homogeneous links comprise equal fibers for all spans (an optical fiber/cable terminated at both ends which may include devices that add, subtract, or attenuate optical signals) which is the usual scenario for point-to-point connections. Inhomogeneous links are usually found in meshed optical networks, where links comprising the same type of fiber can hardly be found.

In a homogeneous scenario, the error on estimating the length of a single link or span does not really cause a problem as, after compensation of linear and nonlinear effects, this error will be averaged out—provided that the error is confined to a reasonable range. Errors of up to 20% on the length specification do not induce any significant impairment, in case DBP is used.

On the other hand, in a meshed network or even on a single link, an error concerning the type of fiber may not be averaged out, resulting in a system outage after DBP is applied.

Finally, in case of wrong measured power levels along the link, the same disadvantage is valid as for estimating the wrong length of the fiber: if the error is uniformly distributed, DBP provides an improvement, otherwise the system performance deteriorates.

The solution presented herein solves the problem mentioned above: Exemplary results for a single homogenous link with a wrong estimation concerning the type of fiber but with exact knowledge of the CD value will be presented.

Examples for different types of fibers are:
Large-Effective Area Pure Silica Core Fiber (LA-PSCF)
Standard Single-Mode optical Fiber (SSMF)

The coherent receiver 200 shown in FIG. 2a is based on the receiver according to FIG. 1. In addition to FIG. 1, a feedback connection 220 is provided between the carrier recovery module 105 and the DBP module which is now an adaptive DBP (A-DBP) module 202. Further, an adaptive estimation module 210 is part of the feedback connection 220. A signal 230 which is the resulting outcome of the carrier recovery 105 is passed on to the Estimation Module 210, where the nonlinear coefficient parameter γ ("Gamma") is estimated or calculated respectively by processing the internal signal 230 forwarded from the carrier recovery module 105 as will be described further below.

According to an embodiment of the proposed solution a wrong description with regard to the type of fiber can initially be provided to the adaptive DBP module 202. Additionally, a correct description of a dispersion parameter is provided to the adaptive DBP module 202. Apart from this, further knowledge being available concerning the link will be the number of spans and the individual length of the spans.

Figure 2B:
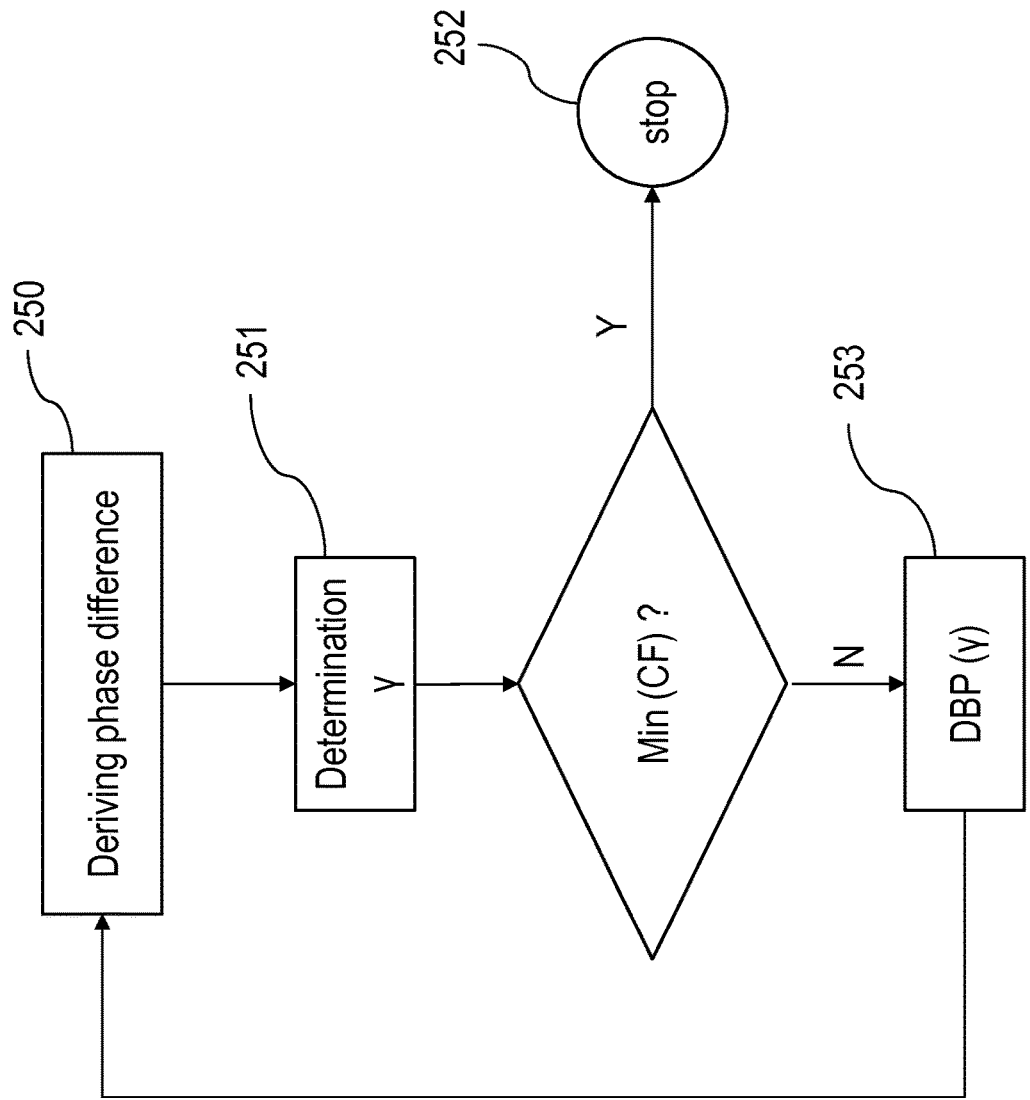
FIG. 2b shows an exemplary flow chart of the proposed solution.

The adaptive algorithm according to the proposed solution, implemented in the adaptive estimation module 210, is explained in more detail, wherein a flow chart of the proposed solution is shown in FIG. 2b.

If it is started with a wrong description of the type of fiber, the initial value of the nonlinear coefficient γ, i.e. γ(0), has to be estimated. Based on the fact that the nonlinear fiber coefficient γ, for commonly installed fibers, varies from 0.6 1/(W*km) (in case of Large-Effective Area Pure Silica Core Fiber (LA-PSCF)), to about 2 1/(W*km) (for the case of non-zero-dispersion shift fiber), the proposed initial value for γ(0) can be set (e.g., per default) at 1.3 1/(W*km), which may correspond to an average value for commercially available fibers. Accordingly, a different value is selected for γ(1), wherein γ(1) indicates the next iteration after γ(0). The actual selected value of the nonlinear coefficient γ (represented by signal 231 in FIG. 2) is forwarded to the Adaptive DBP Module 202.

After frame recovery of the incoming signal 120 processed by the carrier recovery module 105, training sequences (TS) being part of the received signal 120 are extracted and used to derive the residual nonlinear phase difference between received and (originally) transmitted symbols or sequences of symbols—see step 250 in FIG. 2b. It is noted that this is also possible without any training sequence by deriving the residual nonlinear phase difference between received symbols and respective symbols after decision, (which is also called "blind method" or "blind receiver").

The phase difference between the two sequences is defined as $$\Delta\theta(t) = \theta(t) - \theta_{RX}(t)$$

wherein

θ(t) either represents a sequence of training symbols, (θ(t)=$\theta_{TS}$(t)) or a sequence of already decided symbols (θ(t)=$\theta_{DEC}$(t)) and $\theta_{RX}$(t) represents the received symbols.

Both, the use of a blind receiver (using decided symbols θ(t)=$\theta_{DEC}$(t)) and the use of a data-aided method (using training symbols θ(t)=$\theta_{TS}$(t)) is valid.

According to a further embodiment the phase difference between two symbols (or sequences of symbols) can also be determined as follows:

$$\Delta\theta(t) = |\theta(t) - \theta_{RX}(t)|$$

where | . . . | represents the absolute value of the phase difference Δθ(t).

Figure 3:
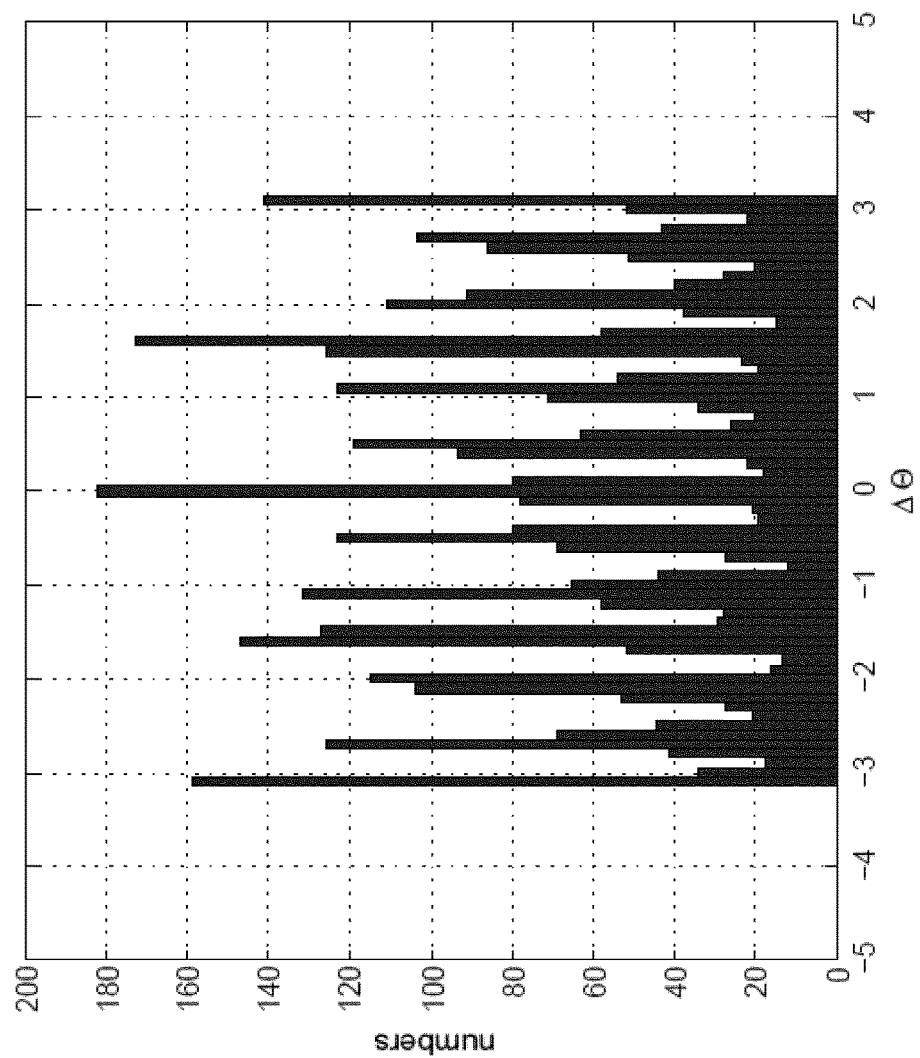
FIG. 3 shows a histogram of the derived phase difference of a 16 QAM modulated signal.

For this example a 16 QAM modulation format is applied for the received signal 120. FIG. 3 presents the respective histogram 300 of the derived phase difference $\Delta\theta(t)$ of such kind of 16 QAM modulated signal, comprising 12 peaks corresponding to the 12 phases of a 16 QAM modulated signal, whereby the value of the phase difference $\Delta\theta(t)$ at the very left and right side of the histogram 300 represent the same angle. This phase information can be obtained by mathematically manipulating the phase information being part of the received symbols (e.g., elimination of phase ambiguity).

Figure 4:
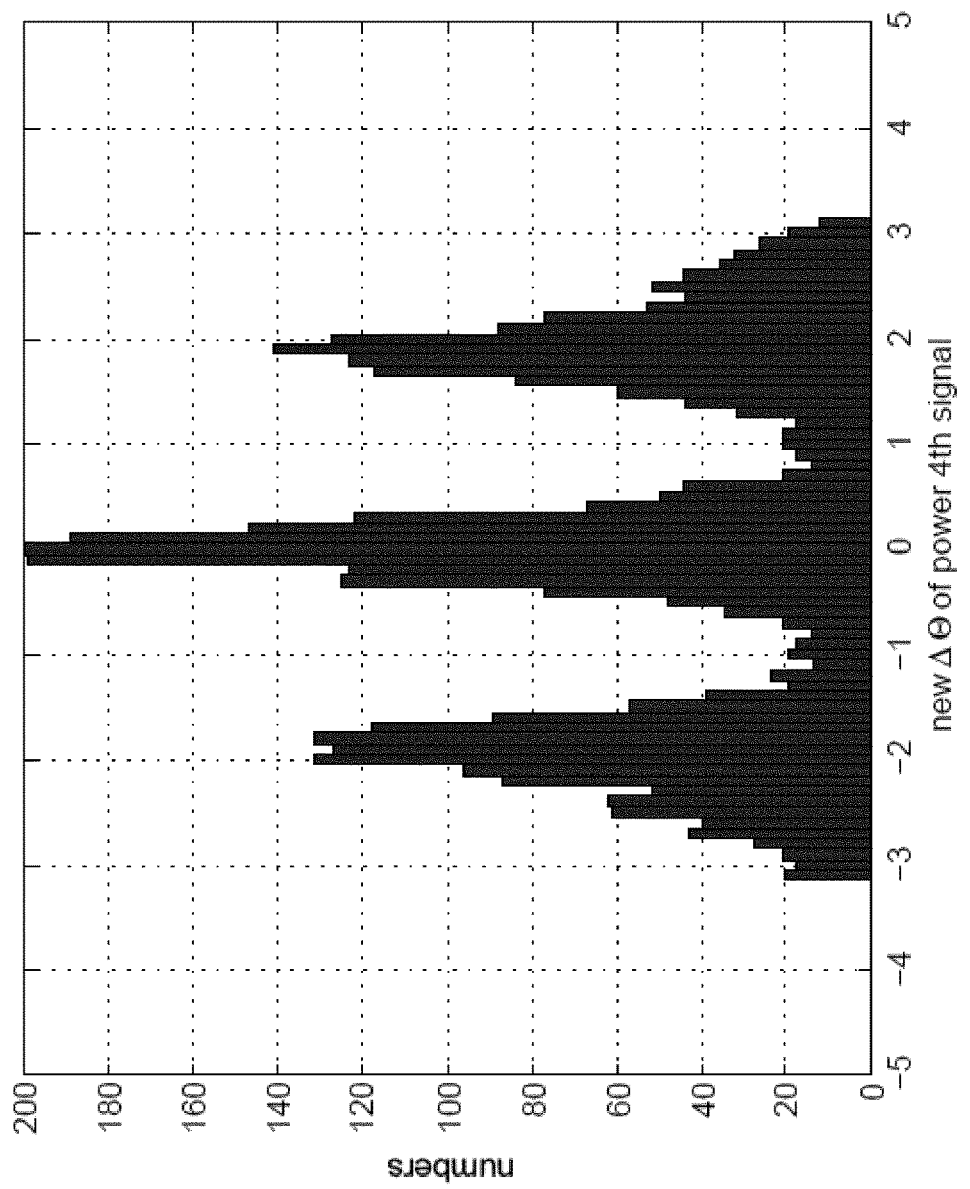
FIG. 4 shows a histogram of the derived phase difference of the $4^{th}$ power of a 16 QAM modulated signal.

Following the proposed method, the $4^{th}$ power is applied to the incoming signal 120 before deriving the residual nonlinear phase difference at the adaptive Estimation Module 210. The respective histogram 400 of the $4^{th}$ power signal is shown in FIG. 4 where only three phases of a single quadrant can be identified accordingly. This information ("spreading of received symbols"), presented in FIG. 4, is the basis for calculating the nonlinear coefficient $\gamma$ by deriving and evaluating a cost function as suggested—step 251 in FIG. 2b.

Figure 5:
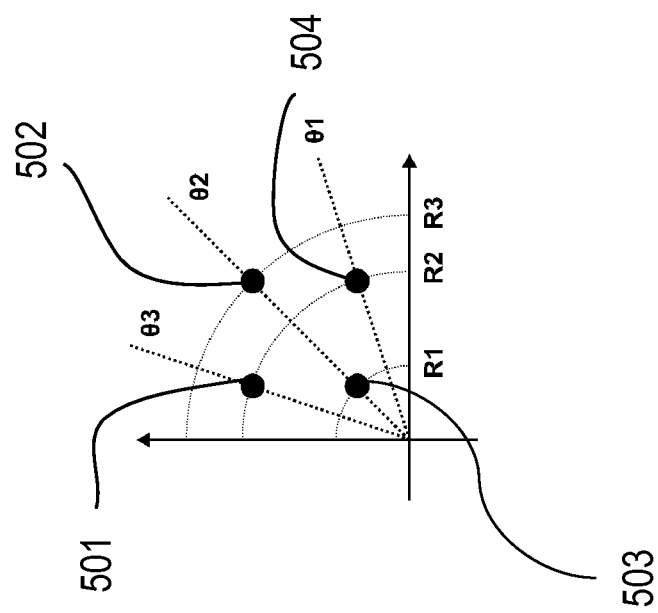
FIG. 5 shows a 16 QAM constellation diagram to the $4^{th}$-power.

As it can be seen by the peak in the middle of the histogram ($\Delta\theta=0$) of FIG. 4, some phases of the received symbols are identified more frequently, because two of the symbols of the $4^{th}$-power of a 16 QAM constellation as shown in FIG. 5 are corresponding to the same phase—represented by symbol 502 and 503 in FIG. 5.

Based on the information available in FIG. 4, i.e. based on the identified phase difference of the $4^{th}$-power of the incoming 16 QAM signal, the following cost function can be determined:

$$CF=[\delta_{\theta 1}+\delta_{\theta 3}]*(1/R_2)+\delta_{\theta 2}*(1/R_1+1/R_3)$$

wherein
$\delta_{\theta 1}$, $\delta_{\theta 2}$, and $\delta_{\theta 3}$ are representing the standard deviation for each of the respective phase differences as shown in FIG. 4, and
R1, R2 and R3 are representing the radii of the 16 QAM constellation as shown in FIG. 5.

The cost function CF is the basis for estimating a variation $\Delta\gamma$ of gamma, which is now explained in more detail:

An optimized (in the purpose of improved) value of the nonlinear coefficient $\gamma$ can be calculated by minimizing the cost function CF mentioned above. The algorithm for optimizing the nonlinear coefficient value $\gamma$ (e.g., according to the "steepest descent algorithm", which is a known optimization algorithm, "http://en.wikipedia.org/wiki/Gradient_descent") is iteratively applied and, e.g., implemented in the adaptive Estimation Module 210 as follows:

$$\gamma(i+1)=\gamma(i)+\mu\Delta\gamma(i)$$

wherein:
i is the index of the discrete time;
$\gamma(i+1)$ represents the value of the nonlinear coefficient at the iteration (i+1);
$\gamma(i)$ represents the value of the nonlinear coefficient at the preceding iteration (i);
$\mu$ represents a convergence factor, comprising an effective fiber length $L_{eff}$ and a channel power P.

The effective fiber length may be derived according to the following exemplary relation:

$$L_{eff} = \frac{1-\exp(-\alpha L)}{\alpha}$$

wherein
$\alpha$ is a fiber attenuation defined in [Np/km].
The algorithm can also be applied by considering only the algebraic sign of the gradient.

Each iteration $\Delta\gamma(i)$ can be derived according to the following equation:

$$\Delta\gamma(i)=\partial CF(\gamma)/\partial\gamma$$

wherein $\partial CF(\gamma)/\partial\gamma$ is a gradient of the cost function over the nonlinear coefficient.

By substituting $\Delta\gamma(i)$ in the iterative optimization algorithm, the new value of the nonlinear coefficient $\gamma$ can be determined according to:

$$\gamma(i+1) = \gamma(i) + \mu\frac{\partial CF(\gamma)}{\partial\gamma}$$

The new value of the nonlinear coefficient $\gamma(i+1)$ is forwarded to the adaptive DBP module 202, wherein the received signal 120 is processed by applying the new value $\gamma(i+1)$—step 253 in FIG. 2b.

After each iteration, the gradient of the cost function CF is evaluated with respect to the previous iteration, whereas a change of the sign of the gradient indicates an end of the iteration loop, i.e. a minimum of the cost function has been reached. At this stage the iterative optimization algorithm can be stopped—step 252 in FIG. 2b.

FIG. 6 shows an example (calculated by simulated data) of the derived cost function CF as a function of the nonlinear coefficient $\gamma$ based on a SSMF fiber with 16-QAM.

The algorithm for determining the optimized value of the nonlinear coefficient $\gamma$ starts by calculating two results of the cost function CF (corresponding to two different initial values of $\gamma$).

In addition, the convergence factor $\mu$ has to be optimized as well to achieve a reduction of computational time without losing quality in estimation accuracy.

In a further example shown in FIG. 7 the respective cost function CF of an 8×82 km SSMF fiber was investigated based on experimental data, considering a launch power of 3 dBm.

According to FIGS. 6 and 7 several important aspects of the proposed solution can be identified:
The information being available after carrier recovery of the received signal is sufficient for determination of the optimized value of the nonlinear coefficient $\gamma$, i.e. FEC (forward error correction) based on a BER calculation can be avoided. Advantageously, the convergence factor for estimating the optimum value of the nonlinear coefficient $\gamma$ can be significantly accelerated.
The cost function CF can be derived analytically wherein verification of the results can be achieved by post-processing simulated and experimental data.
The robustness of the proposed approach has been verified under extreme conditions, showing that an appropriate determination of the nonlinear coefficient $\gamma$ is always successful.

FIG. 8 and FIG. 9 show examples concerning the quality performance of the proposed method based on a Log 10(BER) versus power (dBm) performance, wherein Log 10(BER) is correlated with the quality of the received signal 120 after BER calculation.

FIG. 8 is showing the Log 10(BER) versus power (dBm) performance for simulated data propagated over a 8×82 km LA-PSCF. The first curve (FDE) is showing the alignment of the signal-quality dependent from the power injected into the fiber by compensating only linear impairments using a Frequency Domain Equalizer (FDE). The second curve ($0.6=\gamma_{BP}$) is showing the respective quality alignment by applying a Digital Back Propagation based on a fixed nonlinear coefficient γ=0.6 1/(W*km) which is assumed to be the correct value for the fiber. The third curve (1=$\gamma_{BP}$) is showing the respective quality alignment by applying a Digital Back Propagation based on a wrong nonlinear coefficient value γ=1 1/(W*km). The forth curve (A_BP with initial γ=1) is showing the respective quality alignment by applying an adaptive Digital Back Propagation according to the proposed solution by starting with a (wrong) initial value of the nonlinear coefficient γ=1. As there is only a small difference between the alignment of the second and forth curve it can been verified, that the proposed method is working correctly, i.e. the derived optimized value of the nonlinear coefficient γ after termination of the optimization algorithm according to the proposed method is exactly the same or nearly the same value like the nonlinear coefficient value γ of the real fiber.

FIG. 9 is showing the Log 10(BER) versus power (dBm) performance for experimental data propagated over 8×82 km of SSMF. Again, the first curve (FDE) is showing the alignment of the quality dependent from the power injected into the fiber by only compensating linear impairments using a Frequency Domain Equalizer (FDE). The second curve (0.6=$\gamma_{BP}$) is showing the respective quality alignment by applying a Digital Back Propagation based on a fixed nonlinear coefficient γ=0.6 1/(W*km) which is the correct value according to information of the supplier of the fiber. The third curve (1.3=$\gamma_{BP}$) is showing the respective quality alignment by applying a Digital Back Propagation based on a wrong nonlinear coefficient value γ=1.3 1/(W*km). The forth curve (A_BP with initial γ=1.3) is again showing the respective quality alignment by applying an adaptive Digital Back Propagation according to the proposed solution by starting with a (wrong) initial value of the nonlinear coefficient γ=1.3. Again only small differences can be identified between the second and forth curve, which means that the proposed adaptive Back Propagation algorithm is working correctly even by selecting a wrong initial value of the nonlinear coefficient γ.

It should be noted, that the aforementioned cost function CF, determined exemplarily for processing a 16 QAM modulated signal, is one possible embodiment applying the proposed solution. The proposed solution can be applied for all kinds of modulation formats.

The aforementioned cost function can be generalized as follows:

$$CF_{gen} = \sum_{k \in K}\left[(\delta_{upper,k} + \delta_{lower,k}) \cdot \frac{1}{R_k}\right] + \delta_{center} \cdot \sum_{i \in I} \frac{1}{R_i}$$

with $k \in K; i \in I$ wherein
CF$_{gen}$ is a general cost function
$\delta_{upper,k}$ represents a standard deviation for each of the phase differences $\theta_{upper}$ higher than a central phase $\theta_{center}$ per radius $R_k$
$\delta_{lower,k}$ represents a standard deviation for each of the phase differences $\theta_{lower}$ lower than the central phase $\Theta_{central}$ central per radius $R_k$
$\Theta\delta_{center}$ represents a central phase.
I represents a set of distinct radii of the signal constellation
K represents a set of distinct phase angles of the histogram of the signal constellation after a M-th power operation Adapting the general cost function CF$_{gen}$ for receiving of the 16 QAM modulated signal (as already being part of the exemplary description of the proposed solution), may result to the following cost function CF$_{16}$:

$$CF_{16} = \sum_{k \in K}^{K_{max}} (\delta_{upper} + \delta_{lower}) \cdot \frac{1}{R_2} + \delta_{center} \cdot \left(\frac{1}{R_1} + \frac{1}{R_3}\right)$$

with $k \in [2]; i \in [1, 3]$

Figure 10:
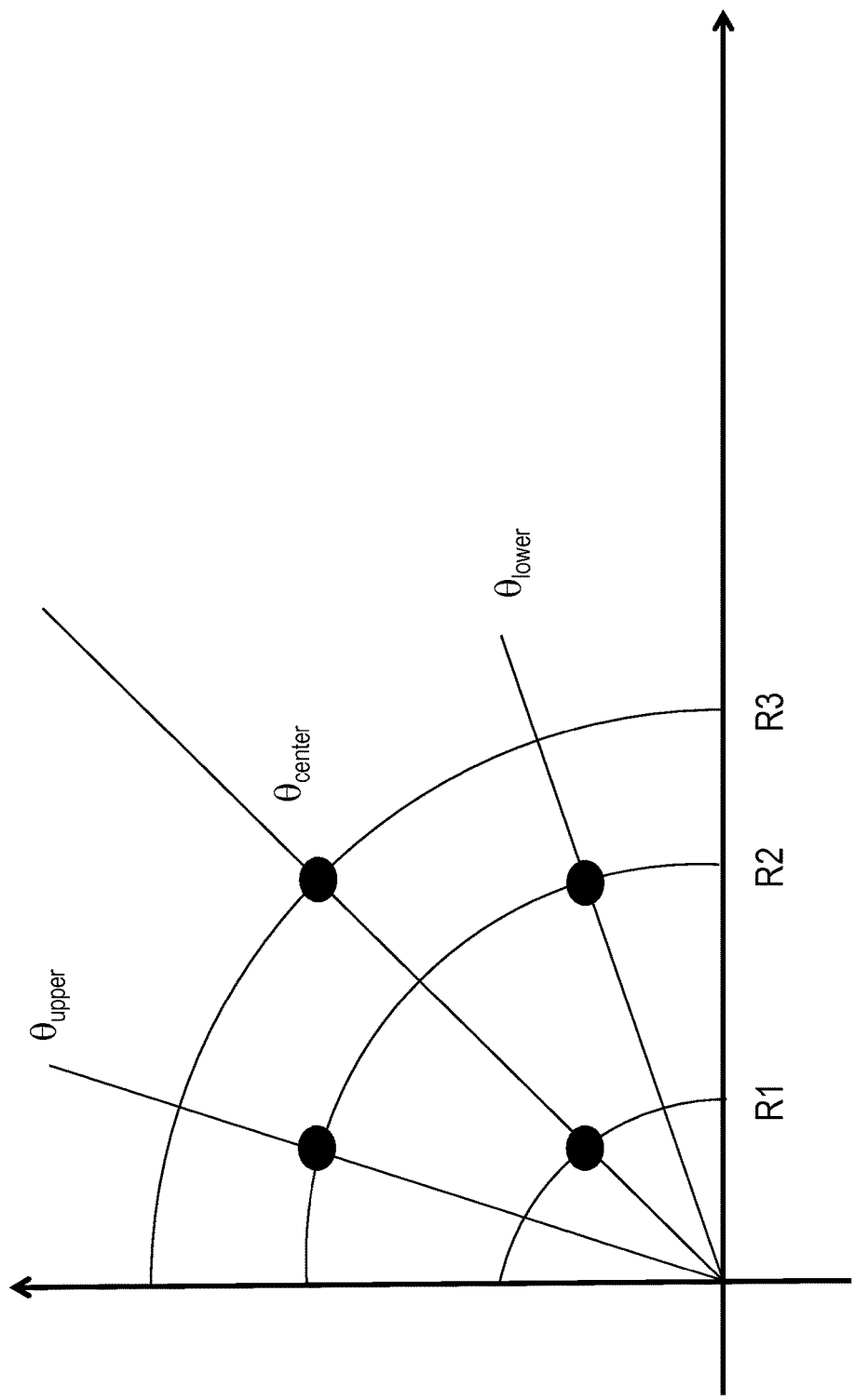

FIG. 10 shows the corresponding 16 QAM constellation diagram applied to the 4$^{th}$ power.

Hereinafter, examples are provided, adapting the general cost function CF$_{gen}$ for processing different modulation formats of the received signal.

Adapting the general cost function CF$_{gen}$ for receiving of a 32 QAM modulated signal:

$$CF_{32} = \sum_{k \in K}\left[(\delta_{upper,k} + \delta_{lower,k}) \cdot \frac{1}{R_k}\right] + \delta_{center} \cdot \sum_{i \in I} \frac{1}{R_i}$$

with $k \in [2, 4, 5]; i \in [1, 3]$

Figure 11:
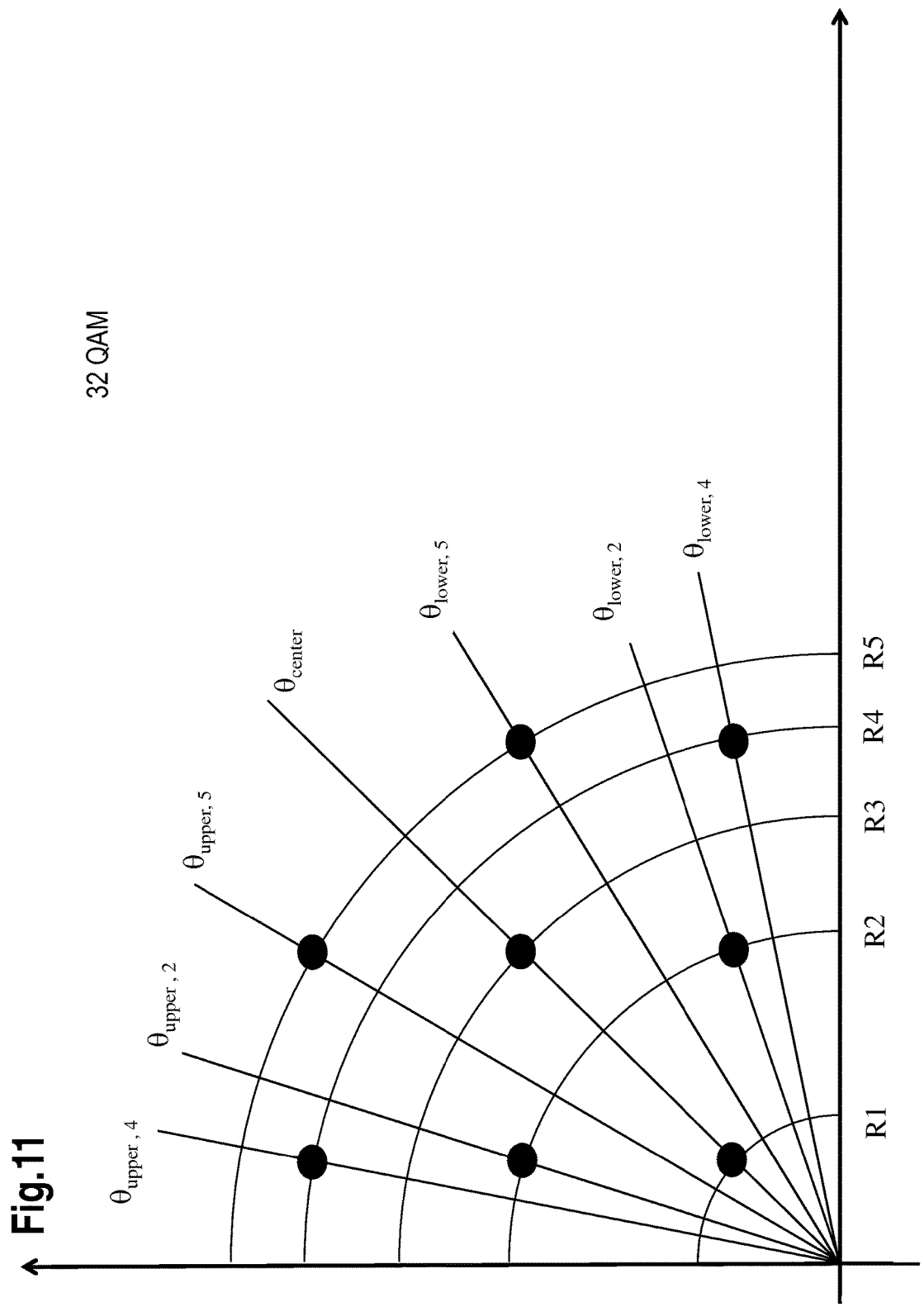

FIG. 11 shows the corresponding 32 QAM constellation diagram applied to the 4$^{th}$ power.

Adapting the general cost function CF$_{gen}$ for receiving of a 64 QAM modulated signal:

$$CF_{64} = \sum_{k \in K}\left[(\delta_{upper,k} + \delta_{lower,k}) \cdot \frac{1}{R_k}\right] + \delta_{center} \cdot \sum_{i \in I} \frac{1}{R_i}$$

with $k \in [2, 4, 5, 6, 7, 8]; i \in [1, 3, 6, 9]$

Figure 12:
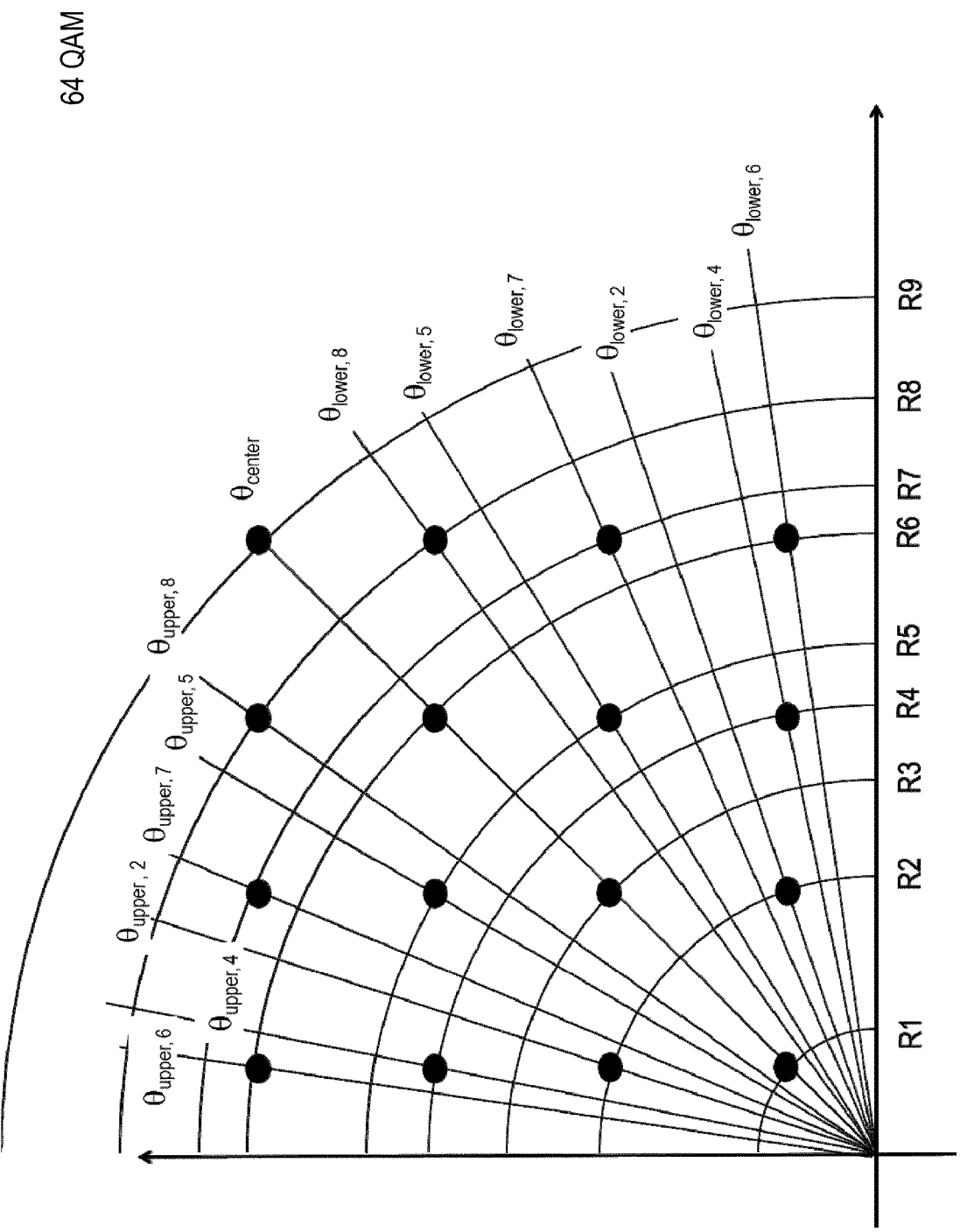

FIG. 12 shows the corresponding 64 QAM constellation diagram to the 4$^{th}$ power.

For receipt of a M-PSK modulated signal, the following cost function can be determined:

$$CF_{M-PSK} = \frac{\delta}{R}$$

with $k = 0; i = 1$

Figure 13:
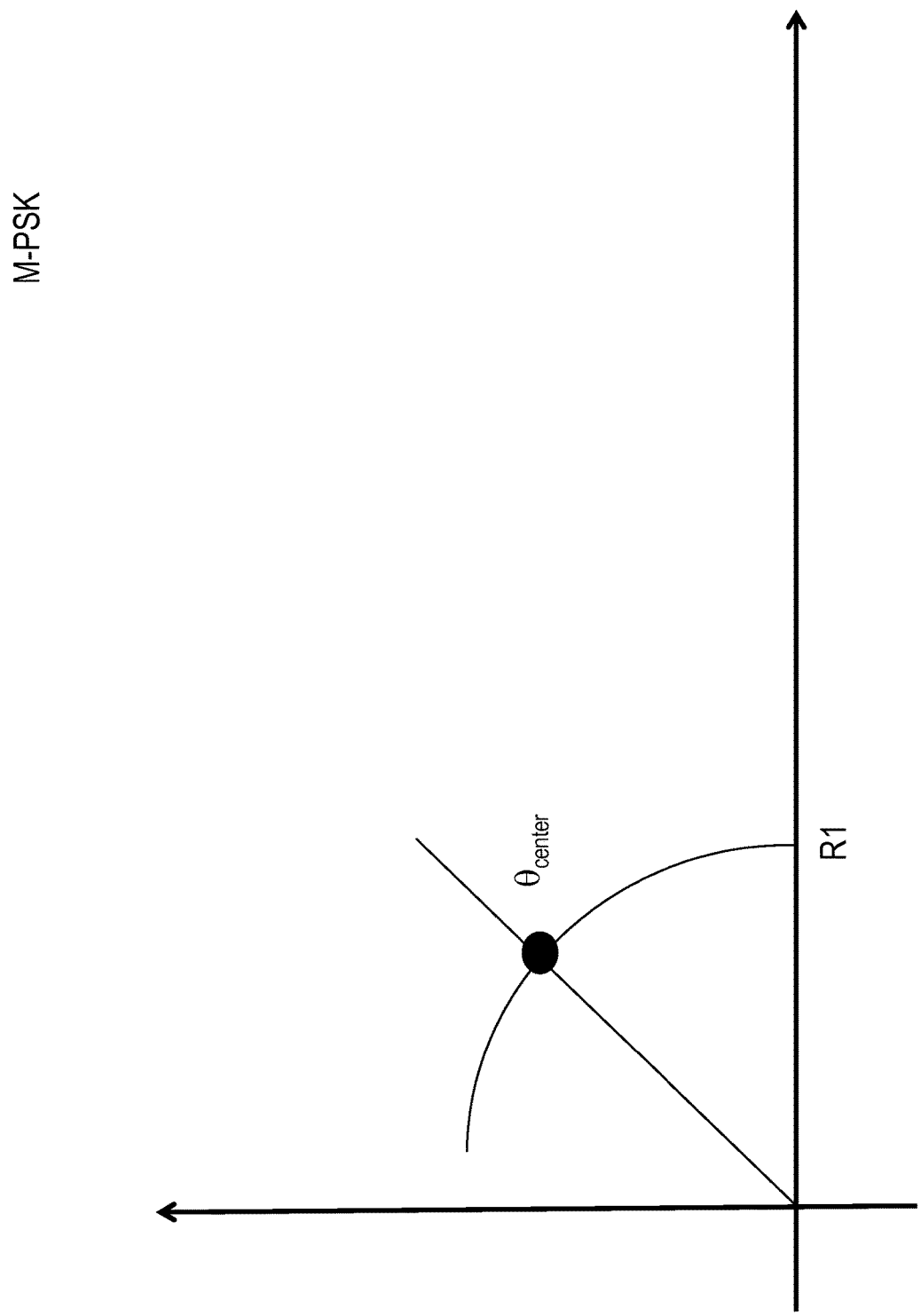

FIG. 13 shows the corresponding M-PSK constellation diagram to the 4$^{th}$ power.

In real DWDM systems details on the transmission link are not or only partially available. Even, if details were available, with the upcoming automatically switched optical networks (ASON/GMPLS) an exact knowledge of the link description would not be available any more, particularly after protection switching or even active traffic routing. The proposed solution for adaptive Digital Back Propagation is capable of a suitable set of parameters for a DBP implementation after a very short initialization cycle.

As a further advantage, no significant changes in the optical receiver are necessary for implementing the proposed solution. The coding of the optimization algorithm can be implemented in a DSP (Digital Signal Processor).

The proposed approach can be implemented in various optical transmission systems using coherent detection, including single carrier and multi carrier, single mode and multi mode.

LIST OF ABBREVIATIONS

DBP Digital Back-Propagation
DEC Decision
DSP Digital Signal Processor
DWDM Dense Wavelength Division Multiplex
BER Bit Error Rate
CD Chromatic Dispersion
CF Cost Function
CPR Carrier Phase Recovery
CR Clock Recovery
DSP Digital Signal Processing
DM Dispersion Managed
FDE Frequency-Domain Equalizer
NDM Non-Dispersion Managed
NLPN Nonlinear Phase Noise
PMD Polarization Mode Dispersion
RX Receive
SPM Self Phase Modulation
TDE Time-Domain Equalizer
TS Training Sequence
XPM Cross Phase Modulation

The invention claimed is:

1. A method for reducing optical transmission impairments, particularly nonlinear effects, of at least one link, comprising the following steps:
   a) receiving an optical signal via the at least one link;
   b) converting the optical signal into a digital electrical representation;
   c) extracting a phase information of the optical signal from the digital electrical representation,
   d) determining with a processor a nonlinear coefficient, associated with the at least one link, based on the phase information,
   e) applying with the processor a control mechanism to the digital electrical representation using the nonlinear coefficient to compensate for impairments of the optical signal,
   wherein the phase information is extracted after a carrier recovery of the optical signal,
   wherein
   a cost function is derived based on the extracted phase information, and
   an optimization algorithm is applied in connection with the cost function to determine the nonlinear coefficient, and
   wherein the optimization algorithm is based on a steepest descent algorithm defined as $\gamma(i+1) = \gamma(i) + \mu \Delta \gamma(i)$, wherein i is an index of a discrete time
   $\gamma(i+1)$ is representing a value of the nonlinear coefficient at iteration (i+1)
   $\gamma(i)$ is representing a value of the nonlinear coefficient at the preceding iteration step (i)
   $\mu$ is representing a convergence factor, comprising an effective fiber length $L_{eff}$ and a channel power P, and
   $\Delta \gamma(i) = \partial CF(\gamma)/\partial \gamma$, wherein CF denotes the cost function.

2. The method according to claim 1,
   repeating the steps c) to e) until a value of the nonlinear coefficient reaches or exceeds a given value.

3. The method according to claim 1, wherein
   the extracted phase information comprises a spreading of received symbols being part of the optical signal, and
   the determination of the nonlinear coefficient is such that a reduced spreading of the received symbols is achieved.

4. The method according to claim 3, wherein a respective spreading of the received symbols comprises respective phase differences between the received symbols and respective transmitted symbols which are derived either with or without a training sequence.

5. The method according to claim 4, wherein
   the optical signal is a coherent signal based on a 16 QAM modulation,
   $4^{th}$ power is applied to the optical signal,
   the respective phase differences are derived from a $4^{th}$ power signal,
   a cost function (CF), based on those derived phase differences, is defined as $CF = [\delta_{\theta 1} + \delta_{\theta 3}] * (1/R_2) + \delta_{\theta 2} * (1/R_1 + 1/R_3)$ wherein
   $\delta_{\theta 1}$, $\delta_{\theta 2}$, and $\delta_{\theta 3}$ are representing a standard deviation for each of the respective phase differences, and
   R1, R2 and R3 are representing radii of a 16 QAM constellation.

6. The method according to claim 1, wherein
   the optimization algorithm starts by calculating two values of the cost function corresponding to two different values of the nonlinear coefficient, and
   a first starting value of the nonlinear coefficient is represented by a selected initial value.

7. The method according to claim 1, wherein
   the nonlinear coefficient is refined as a n-dimensional nonlinear coefficient, representing n single links, and
   the n-dimensional nonlinear coefficient is determined by a n-dimensional calculation.

8. A device comprising
   a converter for converting an optical signal received via at least one link into a digital electrical representation; and
   a processor unit configured for:
   a) extracting phase information of the optical signal from the digital electrical representation,
   b) determining a nonlinear coefficient, associated with the at least one link, based on the phase information,
   c) applying a control mechanism to the digital electrical representation using the nonlinear coefficient to reduce optical transmission impairments of the optical signal, including non-linear effects of the at least one link,
   wherein the phase information is extracted after a carrier recovery of the optical signal,
   wherein
   a cost function is derived based on the extracted phase information, and
   an optimization algorithm is applied in connection with the cost function to determine the nonlinear coefficient, and
   wherein the optimization algorithm is based on a steepest descent algorithm defined as $\gamma(i+1) = \gamma(i) + \mu \Delta \gamma(i)$, wherein i is an index of a discrete time
   $\gamma(i+1)$ is representing a value of the nonlinear coefficient at iteration (i+1)
   $\gamma(i)$ is representing a value of the nonlinear coefficient at the preceding iteration step (i)
   $\mu$ is representing a convergence factor, comprising an effective fiber length $L_{eff}$ and a channel power P, and
   $\Delta \gamma(i) = \partial CF(\gamma)/\partial \gamma$, wherein CF denotes the cost function.

9. The device according to claim 8, wherein the processor unit is arranged so as to repeat the steps a) to c) until a value of the nonlinear coefficient reaches or exceeds a value.

10. The device according to claim 8, wherein said device is a communication device that is or is associated with a receiver for optical signals.

11. A communication system comprising the device according to claim 8.

* * * * *